United States Patent [19]

Leduc

[11] Patent Number: 5,339,520
[45] Date of Patent: Aug. 23, 1994

[54] BRAIDED HIGH-TEMPERATURE PACKING

[76] Inventor: Robert D. Leduc, 72 Nutting Rd., Westford, Mass. 01886

[21] Appl. No.: 61,579

[22] Filed: May 13, 1993

Related U.S. Application Data

[62] Division of Ser. No. 692,495, Apr. 29, 1991, Pat. No. 5,225,262.

[51] Int. Cl.[5] .................... H01R 43/00; B29D 28/00; E21B 33/00
[52] U.S. Cl. ........................... 29/888.3; 87/1; 87/6; 87/9; 264/103; 264/171; 264/505; 264/546; 277/1; 277/227; 156/148
[58] Field of Search ............................ 87/1, 5, 7, 8, 9; 264/505, 510, 546, 103, 171, 172, 286; 277/1, 227, 235 R, 229, 230; 29/888.3; 156/148

[56] References Cited

U.S. PATENT DOCUMENTS

| | | |
|---|---|---|
| 245,930 | 8/1881 | Bartlett . |
| 972,680 | 10/1910 | Cole . |
| 1,325,955 | 12/1919 | Payne . |
| 1,946,528 | 2/1934 | Field . |
| 1,980,720 | 11/1934 | Field et al. . |
| 2,329,994 | 9/1943 | Kingman . |
| 2,562,262 | 1/1946 | DeWitt, Sr. . |
| 2,667,684 | 2/1954 | Boyer et al. . |
| 3,481,824 | 12/1969 | Poltorak . |
| 3,534,652 | 10/1970 | Zumeta . |
| 3,646,846 | 3/1972 | Houghton et al. . |
| 3,791,658 | 2/1974 | Zameta et al. . |
| 4,042,747 | 8/1977 | Breton et al. . |
| 4,068,853 | 1/1978 | Schnitzler ........................ 277/102 |
| 4,157,835 | 6/1979 | Kahle et al. . |
| 4,298,207 | 11/1981 | Hopper et al. . |
| 4,394,023 | 7/1983 | Hinojosa . |
| 4,417,733 | 11/1983 | Usher . |
| 4,455,334 | 6/1984 | Ogino et al. . |
| 4,516,782 | 5/1985 | Usher . |
| 4,524,982 | 6/1985 | Hertz, Jr. . |
| 4,548,265 | 10/1985 | Luke . |
| 4,559,248 | 12/1985 | Sumiyoshi et al. . |
| 4,559,249 | 12/1985 | Arigaya et al. . |
| 4,559,862 | 12/1985 | Case et al. . |
| 4,667,969 | 5/1987 | Suggs, III . |
| 4,705,722 | 11/1987 | Ueda et al. . |
| 4,934,657 | 6/1990 | Dodson . |
| 4,961,988 | 10/1990 | Zhu . |

FOREIGN PATENT DOCUMENTS

| | | |
|---|---|---|
| 0253031 | 1/1988 | European Pat. Off. . |
| 0340303 | 11/1989 | European Pat. Off. ........ F16J 15/10 |
| 35-2504 | 2/1960 | Japan . |
| 55-173765 | 12/1980 | Japan . |
| 60-84476 | 5/1985 | Japan . |
| 61-10362 | 5/1986 | Japan . |

OTHER PUBLICATIONS

Bake et al., Rockwell International, "Test of Asbestos—Free Stem Packing for Valves for Elevated Temperature Service", 1986, Rockwell Technical Article V-Rep. 86-2.

Primary Examiner—James D. Withers
Attorney, Agent, or Firm—Fish & Richardson

[57] ABSTRACT

A high temperature, high pressure resistant packing (e.g., for the packing gland of a valve stem) has a core of density 1.3–1.6 gm/cc that includes a plurality of strands, each strand including a flexible graphite tape, longitudinally corrugated and folded into at least two longitudinally extending partially superimposed layers. Preferable, each strand is overknitted with a reinforcing wire, the strands in the core are braided, and a jacket, which includes a carbide fiber, an inorganic fiber, and a phenolic fiber, is disposed about the core.

7 Claims, 2 Drawing Sheets

BRAIDED HIGH-TEMPERATURE PACKING

This is a division of copending application Ser. No. 07/692,495, filed Apr. 29, 1991 now U.S. Pat. No. 5,225,262.

BACKGROUND OF THE INVENTION

This invention relates to packing, more particularly packing used to seal valve stems and the like.

A variety of packings are known for use in, e.g., a packing gland to seal valve stems exposed to high temperature and high pressure conditions. In the past, asbestos has been a packing of choice; however, due to environmental and health concerns, substitutes for asbestos have been sought. One substitute, described in U.S. Pat. No. 4,705,722, is composed of superimposed flexible graphite sheets, each having a width of less than 5 mm, that are covered by knitting or braiding with a wire or fiber to form a knitting yarn or thread. The knitting yarns are twisted or braided to form the gland packing. Thereafter, the exposed wire or fiber on the surface is removed.

SUMMARY OF THE INVENTION

In one aspect, the present invention features a packing having a core including a plurality of strands characterized in that each strand in the core comprises a flexible graphite tape, longitudinally corrugated and folded into at least two longitudinally extending layers integrally connected along a longitudinal edge thereof, the layers having at least a partially superimposed relationship to one another, the core having a density of 1.3–1.6 gm/cc.

Preferably, the packing has a core characterized in that the core comprises a plurality of braided strands, each strand comprising a flexible graphite tape, longitudinally corrugated and folded into at least two longitudinally extending layers integrally connected along a longitudinal edge thereof, the layers having at least a partially superimposed relationship to one another, each strand further comprising reinforcing wire overknitted about the folded graphite tape; the core has a substantially rectangular cross-section, and a density of about 1.3 to 1.6 gm/cc; and an overbraided jacket is disposed about the core.

In particularly preferred embodiments, the core and the jacket further comprise a dispersed blocking agent that includes graphite and corrosion inhibitors; the reinforcing wire overknitting the strands of the core is a high nickel-chromium-iron alloy; and the jacket comprises a carbide fiber (most preferably silicon carbide), an inorganic fiber (most preferably alkaline resistant glass), and a phenolic fiber (most preferably a novoloid fiber).

In another aspect, the invention features a method for making a packing that includes the steps of forming graphite strands, the forming step comprising longitudinally corrugating a graphite tape, shaping the tape into at least two longitudinally extending layers integrally connected along a longitudinal edge thereof, the layers having at least a partially superimposed relationship to one another, and overknitting the tape with a reinforcing wire; braiding a plurality of the graphite strands to form a substantially rectangular core structure; compressing the core to a density of 1.3–1.6 gm/cc; and overbraiding the core with high strength and high-temperature resistant fibers to form a jacket disposed about the core.

The braided packing of the invention is suitable for high-temperature and high-pressure applications, with functional limits up to 1200° F. and 5,000 psi. The resilience and toughness of the packing is achieved through a flexible packing core of folded, reinforced square plait braided graphite tape overbraided with high strength and high-temperature resistant yarns. The resulting packing is rugged, non-hardening, non-metal, non-stem scoring, and easily removable (e.g., from a packing gland) when it needs to be replaced. The high-temperature/high-pressure resistant packing of the invention has the additional advantage of not requiring the use of asbestos and yet retaining the high-temperature resistant properties of that product. The inner core of the packing can be pre-consolidated to a density approaching the final density and therefore the final product can be live-loaded (e.g., into a valve stem packing gland), thus saving considerable time in the final adjustment of the gland.

Other features and advantages of the invention will be apparent from the following description of the preferred embodiment thereof and from the claims.

DETAILED DESCRIPTION

Figure 1:
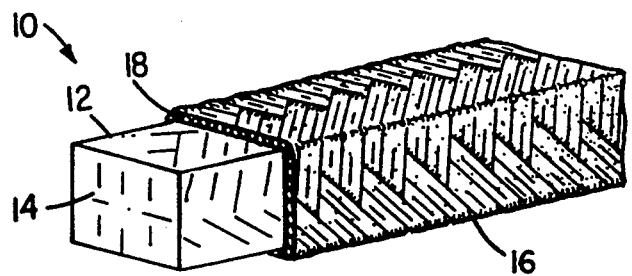
FIG. 1 is a perspective view of a packing having a core and a jacket according to the invention.

Referring now to FIGS. 1–7, the basic packing structure 10 of the present invention consists of a core 12 composed of multiple strands of a graphite yarn 14 that is first braided and then compressed. Graphite yarn 14 consists of a folded exfoliated graphite tape that is overknitted with Inconel ® wire 28. The core 12 is jacketed with an overbraid 16 composed of fibers 18 of silicon carbide and AR (alkaline resistant) glass and Kynol TM sliver (a phenolic novoloid fiber), overwrapped with additional Kynol TM sliver.

Figure 3:
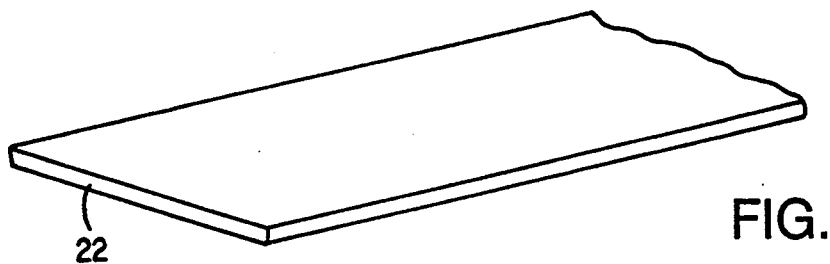
FIG. 3 is a perspective view of graphite tape.
Figure 4:
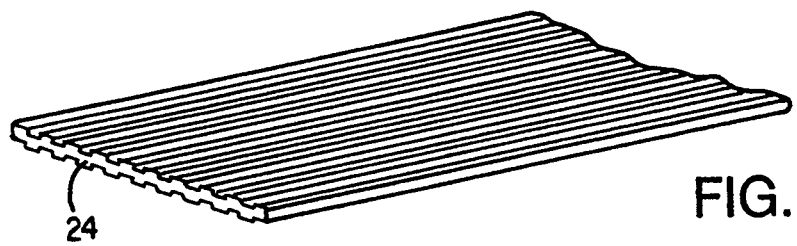
FIG. 4 is a perspective view of corrugated graphite tape.
Figure 5:
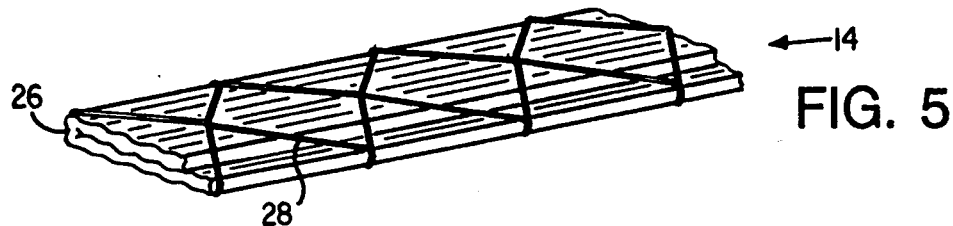
FIG. 5 is a perspective view of a strand of graphite yarn.
Figure 2:
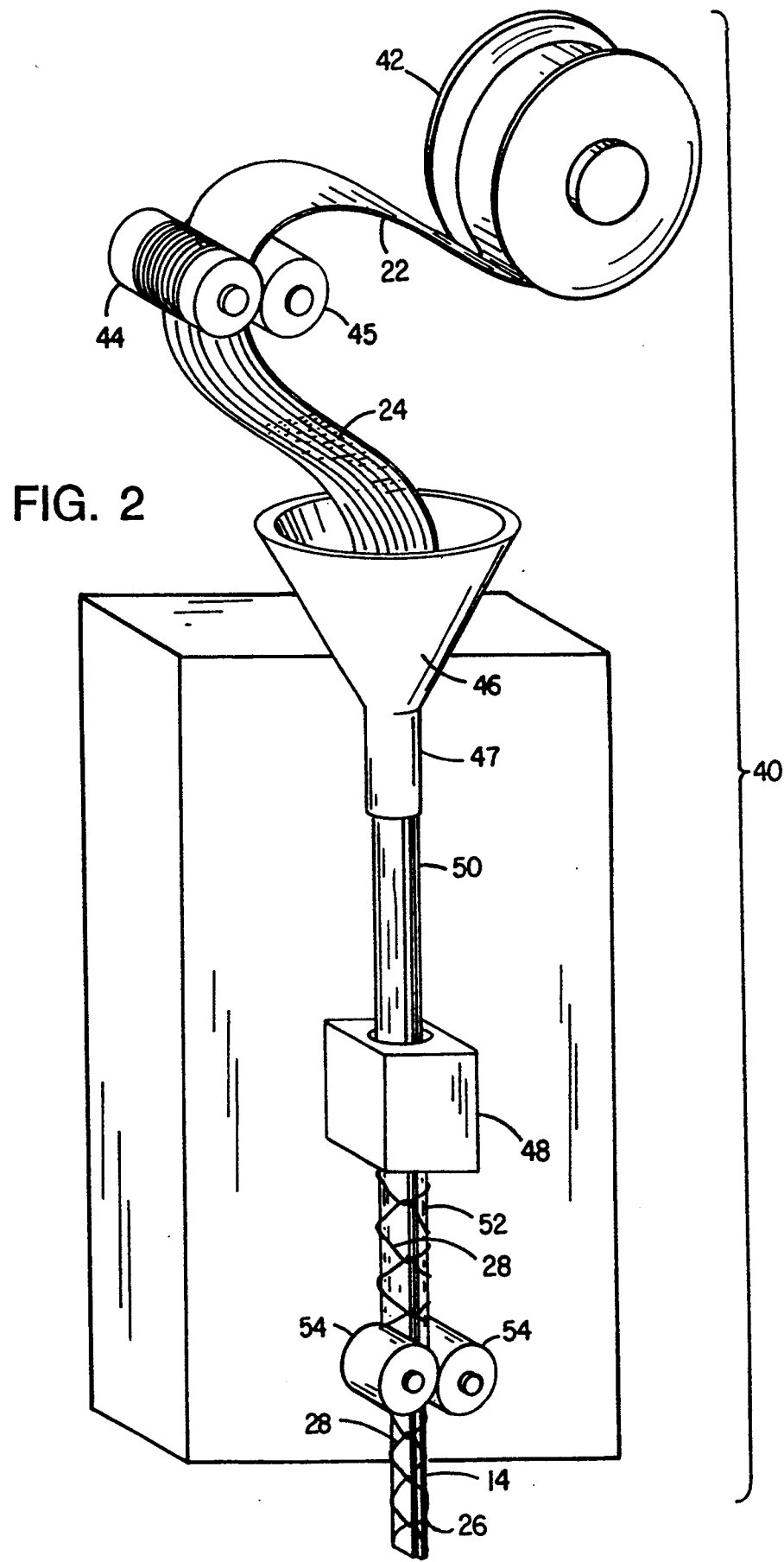
FIG. 2 is a diagrammatic representation of a modified knitting machine.

Referring specifically to FIGS. 2–5, a 0.40" wide × 0.015" thick expanded, exfoliated graphite tape (Polycarbon of Valencia, Calif.) 22, FIG. 3, is mounted on storage reel 42 of a specially modified knitting machine 40 (Lamb Knitting Machine Co., Chickopee, Mass.), FIG. 2. Tape 22 is fed between corrugating steel wheels 44 which are added on the top of the machine and which produce corrugations, FIG. 4, the width of the tape, having a height of about 0.020" and spacing of about 0.030". The corrugated tape 24 is next fed into a funnel 46, also added to the machine, mounted over the knitting head 48. Funnel outlet 47 has a diameter of about 0.250". As the tape emerges from funnel 46, it is "knurled" or formed into a tubular structure 50 and channeled directly into the knitting head 48. A high nickel-chromium-iron alloy wire 28 (Inconel ®, International Nickel Co.), 0.0045" in diameter, is then knitted around the tube 50 using a carbon steel needle plated with hard chrome. The overknitted product 52 is flattened as it is passed through a pair of draw or nip rollers 54. The corrugating rolls 44 and the draw rolls 54 are powered through separate differential drives (not shown) added to the knitting machine and designed to alleviate tension in the graphite tape, to prevent breaking, by maintaining a tape loop between the corrugating rolls and the funnel. The resulting flattened, over-knitted yarn 14 consists of two partially superimposed, longitudinally extending layers of graphite tape 26, overknitted with reinforcing wire 28, as shown in FIG. 5.

Figure 6:
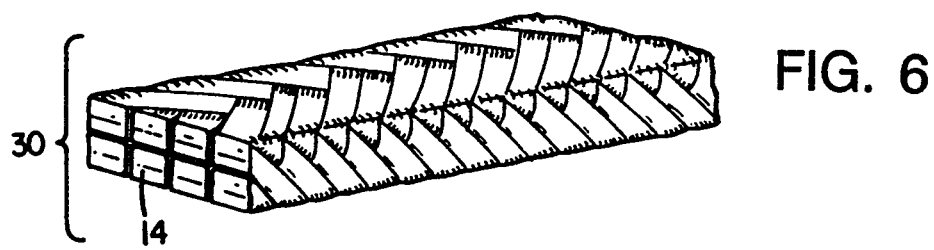
FIG. 6 is a perspective view of a braided, non-consolidated core for a graphite yarn.
Figure 7:
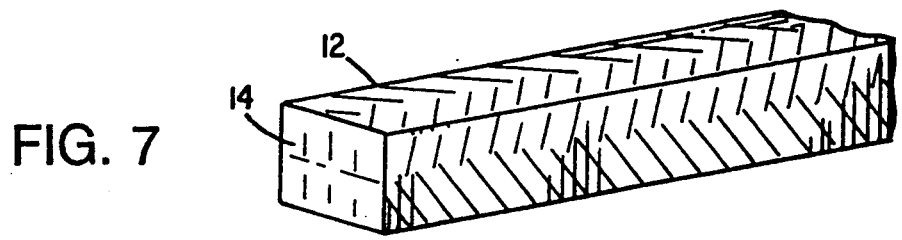
FIG. 7 is a perspective view of a consolidated packing core.

Referring to FIGS. 6 and 7, the resulting graphite yarn 14 is then wound on braider bobbins and braided on an 8 carrier square braider under minimal tension to form a loose braided structure 30. Each bobbin is wound with one or more strands so that each carrier braids a single, double, etc., strand, i.e., 16 strands in total for bobbins wound with two strands. (The number of strands can be varied depending on the desired finished core dimensions.) The loosely braided core is roughly rectangular, having passed between take-off rolls at the exit of the square braider. The rectangular but uncompacted core is then pulled through a blocking agent suspension (described below) of a concentration determined to result in a 12–15% pickup of the blocking agents by the graphite wire core, and the coated graphite yarn is dried in a recirculating air oven at 230°–250° F. The coated, braided core is then fed into a forming press. The press is adjusted to obtain the desired density and rectangular cross-sectional dimensions of the compressed, rectangular core 12. A preferred core density is 1.3–1.4 gm/cc.

The blocking agent suspension consists of 60% colloidal graphite dispersed in water (Grafo LN-610, Metal Lubricants Co., Grafo Colloids Division, Emlenton, Pa.); 38% tungsten disulfide (Sylvania GTE) about 2% waterborne urethane binder (Sancure 1511, Sanncor Industries, Inc., Leominster, Mass.); and about 0.1% sodium and barium molybdate as corrosion inhibitors.

Referring again to FIG. 1, the compressed core 12 is then overbraided on a 16 carrier round braider with a high-temperature resistant, high strength yarn. Each carrier is wound with two or more yarn strands so as to braid a double, etc., strand. (The number of strands can be varied according to the desired cross-section of the completed packing.) The overbraid jacket yarns consist of a core of about 40% AR glass fiber (Erskine-Johns Co., Los Angeles, Calif.) (i.e., 3 strands), 10% silicon carbide fiber (Textron Specialty Materials, Lowell, Mass.) (i.e., 1 strand), and 20% novoloid fiber from sliver (Kynol TM, American Kynol, Inc., New York, N.Y.), by weight, wrapped with additional Kynol TM sliver so as to comprise 50% Kynol TM total by weight. The overbraid jacket yarn is constructed in a Dref3 TM machine (Fehrer AG, Linz, Austria) by feeding continuous strands of silicon carbide and AR glass, and Kynol TM sliver into the Dref machine as the yarn core and wrapping the yarn core with additional Kynol TM sliver. The overwrap fiber provides a hydroscopic surface so that blocking agents and corrosion inhibitors will remain attached to the basic fiber when applied. A novoloid fiber also turns to carbon without the evolution of toxic byproducts in the degredation process occurring during exposure of the fiber to high temperatures. The finished, overbraided product is then pulled through the blocking agent suspension described above and dried in an air-circulating oven at 230°–250° F. The coated final product is again formed in a forming press to render a rectangular cross-section to the completed packing. At this point the core density may be increased over the its initial density but should not exceed 1.6 gm/cc.

In particular embodiments, the number of strands used on the braider bobbins for the core and the jacket and the final cross-sectional dimensions for the packing corresponding to a particular packing gland cross-sectional category may be as given in the table below:

| Finish Form Category | No. Strands on Core Braider Bobbin | No. Strands on Jacket Braider Bobbin | Final Packing Dimensions |
| --- | --- | --- | --- |
| 1/4" | 1 | 2 | .170" × .280" |
| 5/16" | 1 | 2 | .220" × .355" |
| 3/8" | 2 | 2 | .310" × .390" |
| 1/2" | 3 | 3 | .430" × .520" |

The packing may be formed into conventionally shaped packing rings and may be inserted in a packing gland around a valve stem. The gland may be "live-loaded," with springs interposed between the gland and the gland bolt heads. The gland bolts are tightened to a desired extent. Because of the known packing density, a predicted gland load will be applied with a given bolt torque, and the springs will maintain the desired gland load during the operation of the valve.

Other embodiments of this invention which will occur to those skilled in the art are within the scope of the following claims.

What is claimed is:
1. A method for making a packing comprising the steps of
   forming graphite strands, said forming step comprising
      longitudinally corrugating a graphite tape,
      forming said tape into at least two longitudinally extending layers integrally connected along a longitudinal edge thereof, said layers having at least a partially superimposed relationship to one another, and
      overknitting said tape with a reinforcing wire;
   braiding a plurality of said graphite strands to form a substantially rectangular core structure;
   compressing said core to a density of 1.3–1.6 gm/cc; and
   overbraiding said core with yarns forming a jacket disposed about said core.

2. The method of claim 1 further comprising compressing said jacketed packing to a density of not greater than 1.6 gm/cc.

3. The method of claim 1 wherein in said overbraiding step, said jacket yarns comprise a carbide fiber, an inorganic fiber, and a phenolic fiber.

4. The method of claim 3 wherein in said overbraiding step, said carbide fiber is silicon carbide, said inorganic fiber is alkaline resistant glass, and said phenolic fiber is a novoloid fiber.

5. The method of claim 1 further comprising impregnating said core with graphite and corrosion inhibitors.

6. The method of claim 5 further comprising impregnating said jacketed packing with graphite and corrosion inhibitors.

7. The method of claim 6 further comprising compressing said jacketed packing to a density of not greater than 1.6 gm/cc.

* * * * *